Jan. 20, 1942.  C. H. MERRELL  2,270,597
INTERNAL COMBUSTION ENGINE
Filed Nov. 1, 1940  5 Sheets-Sheet 1

C. H. Merrell
INVENTOR.
BY
ATTORNEYS.

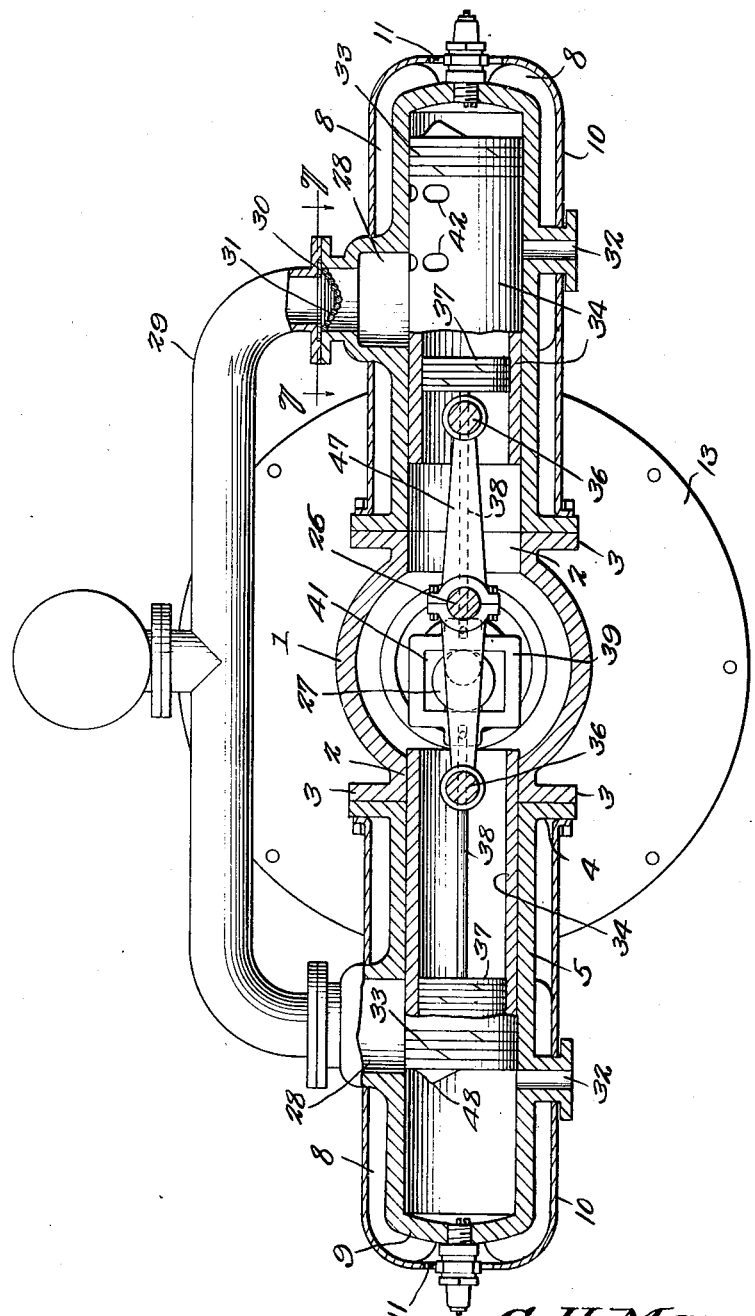

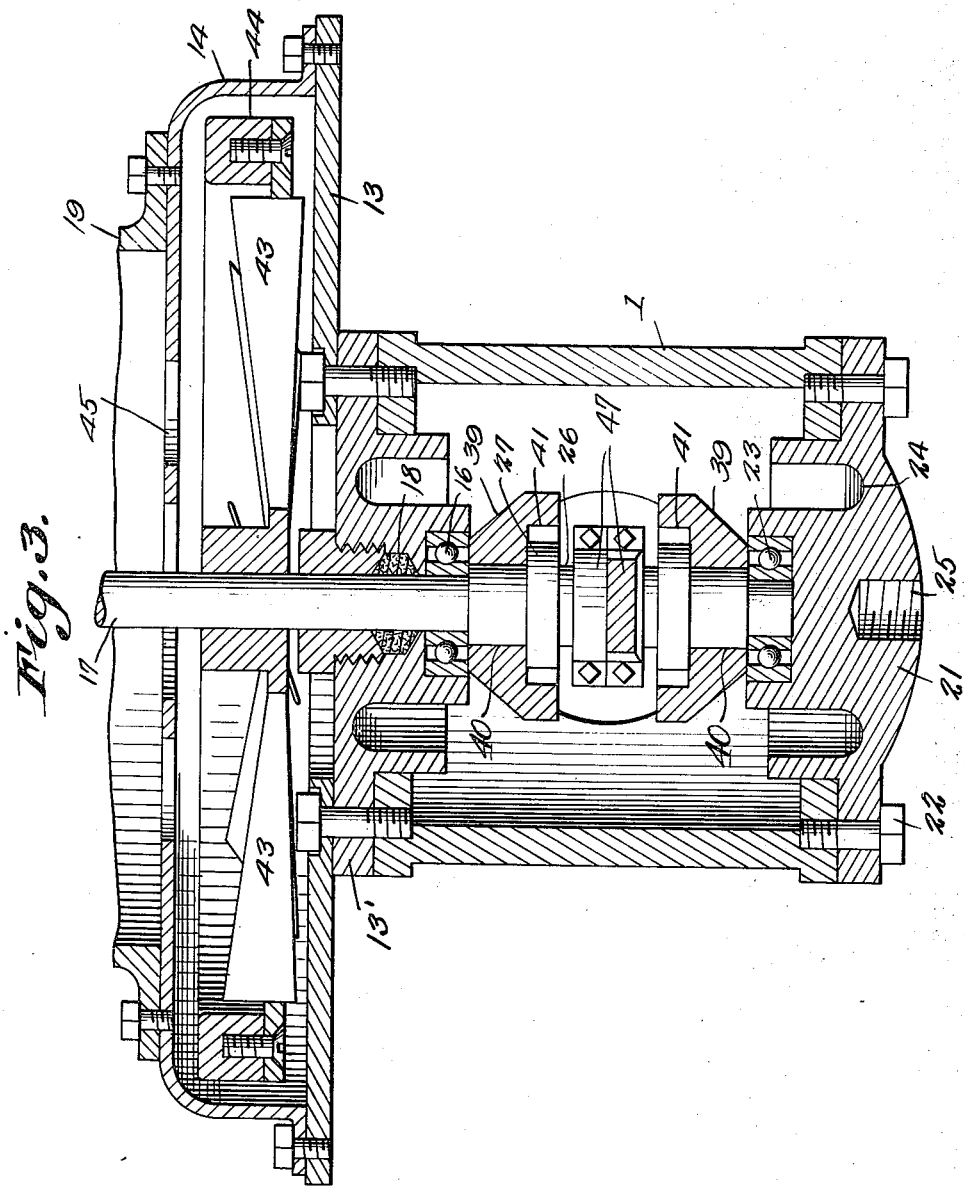

Jan. 20, 1942.  C. H. MERRELL  2,270,597
INTERNAL COMBUSTION ENGINE
Filed Nov. 1, 1940  5 Sheets-Sheet 4

C. H. Merrell
INVENTOR.
BY
ATTORNEYS.

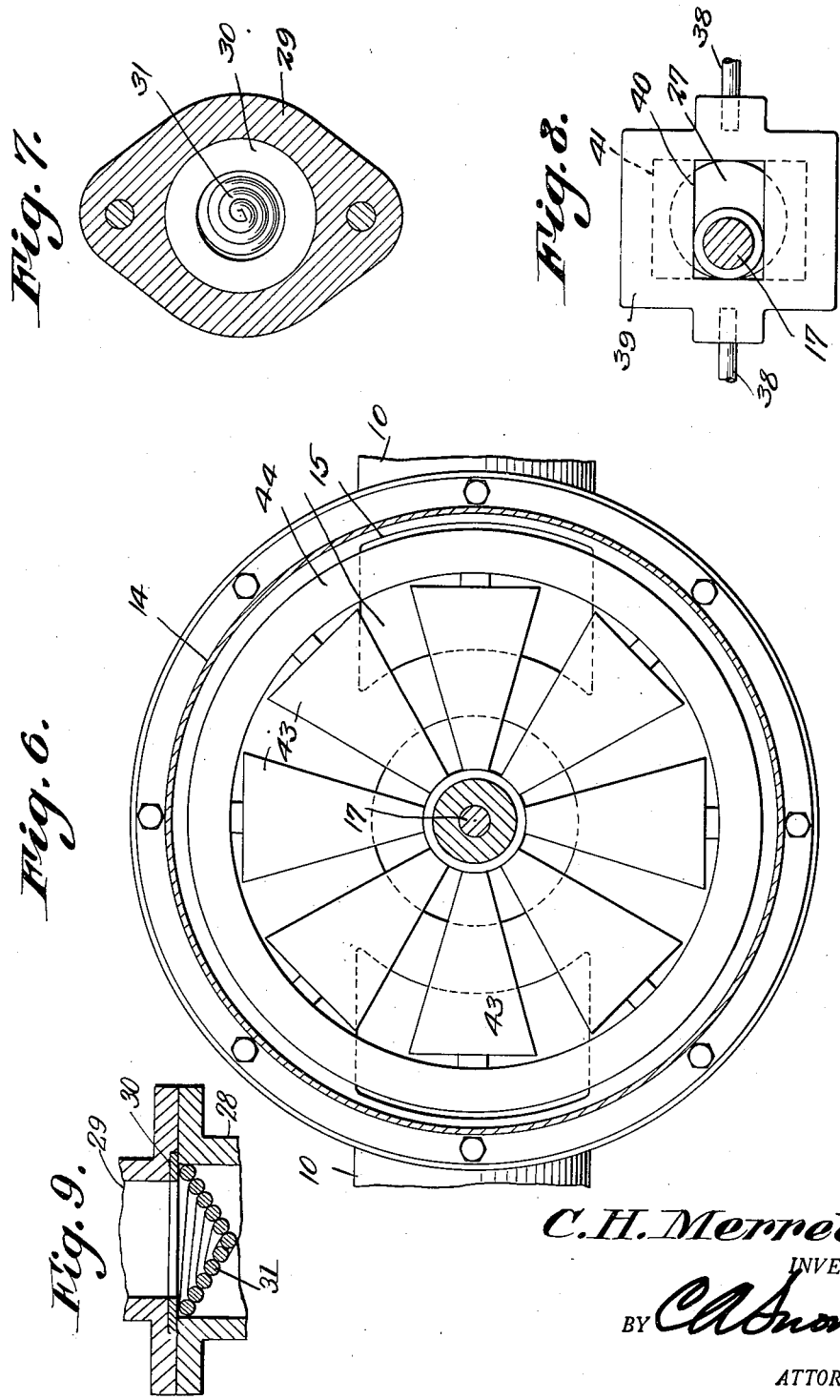

Patented Jan. 20, 1942

2,270,597

UNITED STATES PATENT OFFICE 2,270,597

INTERNAL COMBUSTION ENGINE

Cleburne Higgins Merrell, Beaumont, Tex.

Application November 1, 1940, Serial No. 363,937

5 Claims. (Cl. 123—50)

This invention relates to internal combustion engines, one of the objects being to provide a two-cycle engine which does not require mixing of lubricating oil with the fuel and which is so balanced in operation as to practically overcome vibration.

A further object is to provide a new and novel arrangement of pistons which obviates the necessity of releasing an excessive vacuum at the end of the stroke but, on the contrary, reduces the vacuum throughout the entire stroke so that no force is set up tending to reduce the maximum efficiency of the engine.

Another object is to provide an engine utilizing opposed main pistons each of which constitutes a cylinder for holding a compression or breather piston operating in a predetermined timed relation with the main piston whereby during one stroke of the piston a charge is compressed and exploded while another or fresh charge is being sucked into the main piston whereas, during the next stroke, the fresh charge is directed into a compression chamber, the combustion chamber is scavenged, and the compressed charge is released into the combustion chamber.

Another object is to provide an internal combustion engine having new and novel means whereby the cylinders are kept cool by a forced circulation of air.

Another object is to provide a means for accurately guiding each compression piston in its movement relative to its main piston so as to overcome any tendency of the piston to rock and become excessively warm.

It is a fact well known to those skilled in the art that in the conventional two-cycle engines there are two losses in air transmission during each power stroke. For example in a two-cycle engine that takes its air into the base, a vacuum is created by the upward thrust of the piston. A valve opens into the crankcase and air rushes in to fill the void, but before the void is completely filled the piston starts back in a downward stroke, thereby leaving an insufficient quantity of air in the crankcase to fill the cylinder. This constitutes one of the losses mentioned. The second loss occurs when the air passes from the crankcase to the cylinder due to the same reason. The present invention has for an object to overcome these losses by an increased displacement between the main and compression or breather pistons of each pair.

A still further object is to provide a two-cycle engine which, because of its simple and compact construction, can be utilized as a supplemental engine on a motor vehicle or the like for the purpose of generating electricity and charging a battery as needed, the engine and generator being built in a complete unit.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 2 is a section on line 2—2, Figure 1.

Figure 3 is an enlarged section on line 3—3, Figure 1.

Figure 6 is an enlarged section on line 6—6, Figure 1.

Figure 7 is an enlarged section on line 7—7, Figure 2.

Figure 8 is a section through the cam-shaft and showing a face view of one of the crossheads and the cam cooperating therewith.

Figure 9 is an enlarged section through the spring intake valve.

Figure 1:
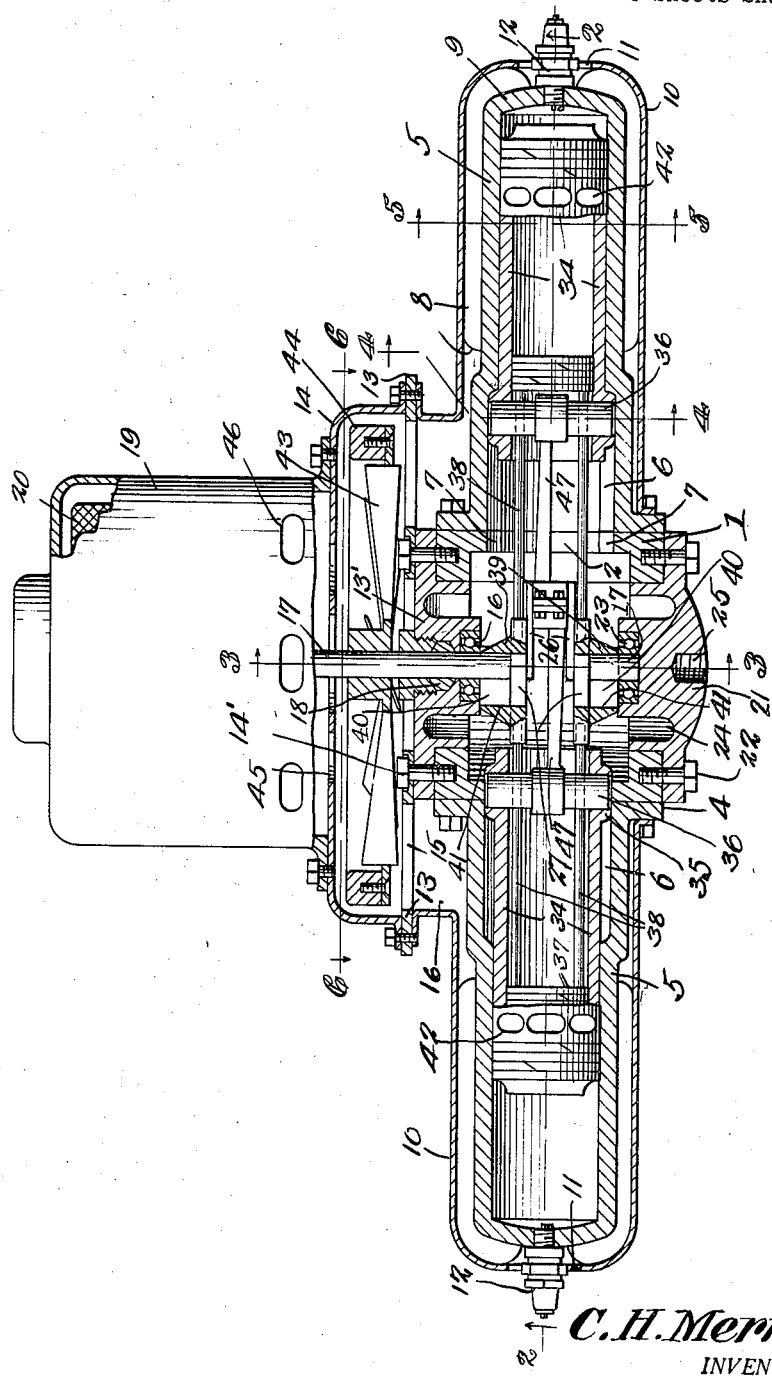
Figure 1 is a central vertical longitudinal section through the engine, the generator housing being shown in elevation.

Referring to the figures by characters of reference, 1 designates the main body of the crankcase provided with opposed alined openings 2 about which are extended flanges 3. To each of these flanges is bolted or otherwise secured the flanged end 4 of a main cylinder 5. Two of these cylinders are provided, these being oppositely disposed and coaxial with their bores flush with the openings 2. As shown particularly in Figure 1 each of the cylinders is offset longitudinally at diametrically opposed points adjacent to its flanged end to provide internal guide grooves 6, these grooves registering with corresponding grooves or recesses in the wall of the adjacent body opening 2. These grooves or recesses have been indicated at 7.

Figure 5:
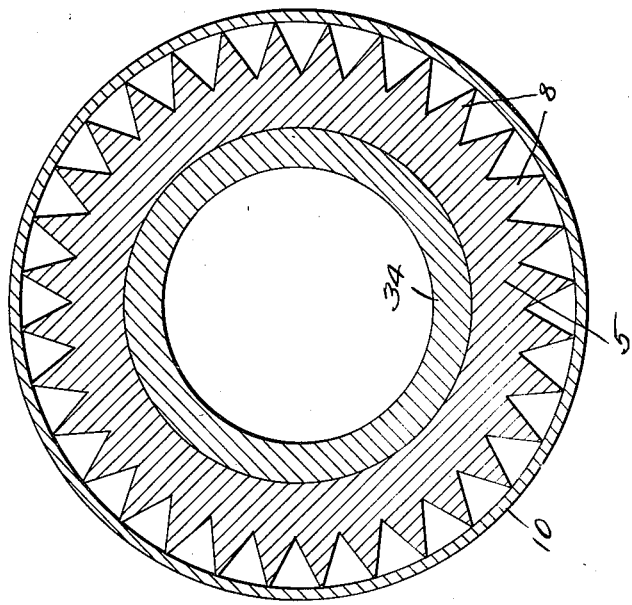
Figure 5 is an enlarged section on line 5—5, Figure 1.
Figure 4:
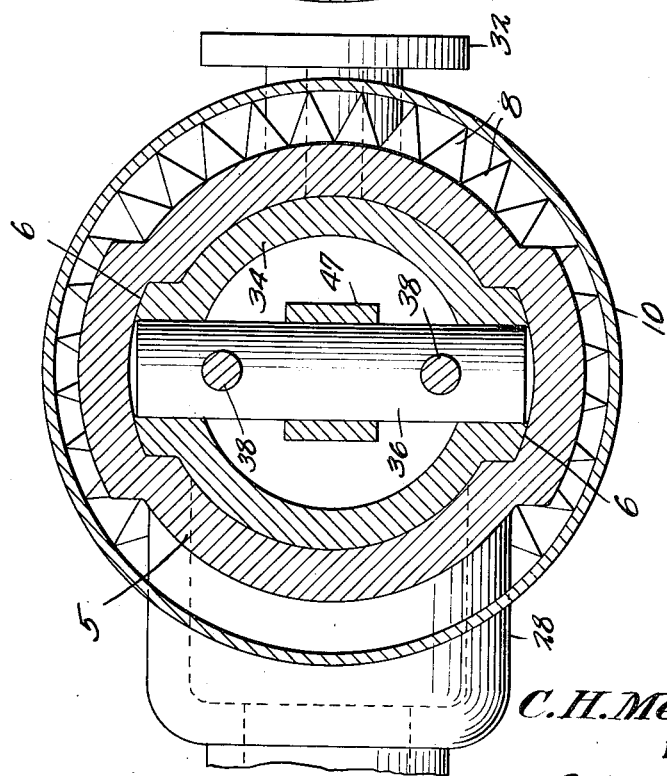
Figure 4 is an enlarged section on line 4—4, Figure 1.

Ribs or fins 8 are formed on each cylinder 5 and extend radially of the outer ends or heads 9 of the cylinders and also longitudinally of the cylinders so as thus to form air grooves or passages between them as will be apparent by referring to Figures 4 and 5.

Each cylinder 5 is housed within a casing 10 which is fitted snugly against the outer edges of the ribs and thus serves to close the outer portions of the passages between the ribs. Each casing has an aperture 11 at one end through which is extended a spark plug 12 mounted in the head 9 of the adjacent cylinder 5. These openings constitute air intake ports whereby air is supplied to the channels or passages between the pins or ribs 8.

The upper end of the body 1 is closed by a head 13' which is fitted thereinto and is held in place by bolts 14' or the like. On this head is mounted a disk 13 constituting the base of a fan housing 14 bolted thereto. The base has openings 15 in communication with outlets 16 provided in the respective casings 10 adjacent to the inner ends or bases of the cylinders 5.

The head 13' carries a bearing 16 for a shaft 17 which is extended through a packing gland 18 in the head and also through the housing 14 into the housing 19 of a generator a portion of which has been indicated at 20.

The main body of the crankcase is also closed by a head 21 which can constitute the base thereof, this head being held in place by bolts 22 or in any other suitable manner and being provided with a bearing 23 for one end of the shaft 17. A circular well 24 for holding a lubricant, can be formed in the head 21 and concentric therewith. This head may also be provided with a bore 25 extending thereinto from the bottom thereof for the reception of a stud or the like projecting from a support, not shown.

The top portion of the shaft 17 contained within the crankcase is provided with a centrally disposed crank 26 and secured to the shaft at opposite sides of the crank so as to rotate therewith are cams 27 the long radii of which are extended oppositely to the crank 26 as will be apparent by referring particularly to Figure 2.

Each cylinder 5 is provided at one side and between its ends with a compression chamber 28 which opens into the cylinder and also into one end of an intake manifold 29. A valve of novel construction is located between the intake manifold and each of these compression chambers. Each valve comprises a ring 30 which is fastened securely between the wall of the compression chamber 28 and the end of the intake manifold and secured snugly to that surface of the ring nearest the chamber 28 is the large end convolution of a conical spring 31. The apex of this spring is extended toward the chamber 28 and under normal conditions the convolutions are positioned tightly one against the other. Thus when the valve formed by spring 31 is subjected to pressure from within the chamber 28, the convolutions will be held tightly together and prevent escape of gaseous fuel from said chamber back into the manifold 29 from which it has been drawn. When a suction is set up within chamber 28, however, the convolutions of the spring valve will move apart, thereby providing spaces through which the fuel can flow readily into the chamber 28.

Each cylinder 5 is provided at a point substantially opposite to the chamber 28 with an exhaust port 32. This port is so located that a piston sliding in one direction within cylinder 5 will first uncover or open the port 32 and, during the last portion of said opening motion, establish communication between chamber 28 and the interior of the piston.

Mounted to reciprocate within each cylinder 5 is a main piston 33 having a tubular extension or skirt 34 forming a breather cylinder. Each cylinder has laterally extended bosses 35 projecting into and guided by the grooves 6 and 7. These bosses also provide seats for pins 36, preferably of bronze, which extend diametrically across and are movable with the breather cylinders 34.

Mounted for reciprocation within each breather cylinder is a breather piston 37 and from each of these pistons is extended a pair of connecting rods 38. The rods of each pair extend diametrically through and are slidable within one of the pins 36 and, as shown particularly in Figures 1 and 8, the two pairs of rods are attached to opposite sides respectfully of cross-heads 39. Each of these cross-heads is provided with a slot 40 through which the shaft 17 is extended so that the cross-heads thus are guided by the shaft. Each of the cross-heads is also formed with a rectangular recess 41 in which is seated one of the cams 27. In view of the relative arrangement of the cams 27 and crank 26 it will be apparent that when one piston 33 is retracted to one end of its stroke and the other piston 33 is at the other end of its stroke, as shown in Figure 2, the piston 37 in the retracted piston 33 will be in its extended position while the piston 37 in the other piston 33 will be in retracted position.

Each of the breather cylinders 34 forming a part of piston 33 has spaced intake parts 42. These ports are spaced longitudinally of the cylinder 34 and are positioned where they can be brought into communication with the compression chamber 28 at proper times during the working of the engine and as hereinafter explained.

The shaft 17 is provided, within the housing 14, with a suction fan 43 the rim 44 of which is in the form of a ring constituting a weight so as to serve as a fly-wheel. Thus when shaft 17 is driven in one direction by the motor-generator 20 in housing 19, the fan 43 will operate to set up a suction of air through the openings 11 against the outer ends or heads 9 of the cylinders 5 and thence along the passages between the ribs 8 and in casing 10 to the ports or openings 15. The air will then be exhausted upwardly through openings 45 in the top of housing 14 and into the housing 19 which, as shown, is provided with outlets 46.

When the shaft 17 is rotated the two pistons 33 are moved simultaneously in one direction by their connecting rods 47 and crank 26, while the two pistons 37 are moved simultaneously in the opposite direction. As the pistons 33 and 37 move apart in one cylinder 5 as shown at the right of Figure 2, a suction is set up due to the creation of a partial vacuum between these two pistons and as some of the ports 42 are in communication with the adjacent compression chamber 28, a supply of fuel will be sucked from the manifold 29 past valve 31 and through chamber 28, a supply of fuel will be sucked from the manifold 29 past valve 31 and through chamber 28 into cylinders 34 between the two pistons 33 and 37. Upon the completion of this action fuel in cylinder 5 has been fully compressed by piston 33 and exploded. When this explosion takes place piston 33 is moved into position to expose the exhaust port 32 as shown at the left of Figure 2 and during this action of piston 33, the piston 37 is advanced in cylinder 34 so that the fuel previously drawn into said cylinder 34 is forced outwardly therefrom through those ports 42 in communication with the chamber 28. Fuel is compressed in this chamber 28 until, following the opening of port 32, communication is established between chamber 28 and the combustion chamber. The compressed fuel immediately rushes from chamber 28 into cylinder 5 and during this action it will come against and be deflected by a baffle 48 on piston 33. Consequently the fuel entering cylinder 5 will be forced toward the head 9 of the cylinder, sweeping the burned gases ahead of it. Before the unconsumed fuel can reach the exhaust port 32, said port will have been closed by the advancing piston 33 which thus operates to place the newly admitted fuel under compression preparatory to being exploded. Obviously during this action the piston 37 in the cylinder 34 of the advancing piston 33 is being retracted and a new charge of fuel is being drawn into cylinder 34 as before explained.

The parts can be so proportioned that the displacement between the pistons 33 and 37 will be as much as ten per cent greater than that of the explosion chamber so that no loss of power occurs should a partial vacuum be maintained due to failure to instantly supply an amount of fuel equal to the full capacity of the combustion chamber.

An engine such as herein described is very simple and compact in construction. It does not require the use of gasoline mixed with lubricant but is lubricated by the usual splash system. As the rods 38 are guided within the wrist pins 36, they are amply supported at all times during the operation of the engine and serve to prevent any tilting action of the pistons 37 while operating. While the engine is adapted to many uses, it might be stated that one object is to utilize it as a means for operating a generator-motor. The engine can be used for operating the generator when desired for the purpose, for example, of charging a battery and thereafter the generator can be used as a motor for starting the engine. These operations can of course be effected by well known automatic switching arrangements and it is not deemed necessary to show or describe the same in detail.

Importance is attached to the fact that the air used as a cooling medium is drawn into the engine at the hottest points, namely, the heads 9 and after leaving these heads the air circulates along the cylinders 5 to the outlet ports. Thus the cooling means is more efficient than should the air be supplied at other points.

What is claimed is:

1. An engine including opposed cylinders each having an exhaust port, a compression chamber opening into each cylinder and having a valved intake, opposed reciprocating main pistons in the main cylinders each having a tubular extension providing a breather cylinder having intake ports positioned for intermittent communication with one of the chambers, each main piston constituting a closure for the exhaust port in its main cylinder and being proportioned to successively open the exhaust port and momentarily establish communication between said main cylinder and its compression chamber while said main piston approaches the end of its power stroke, a breather piston mounted for reciprocation in each breather cylinder, a shaft between the cylinders, driving connections between the shaft and the main and breather pistons respectively, said connections being timed to move the breather pistons in unison oppositely to the main pistons, a fan housing, casings housing the main cylinders having air inlets at the firing ends of said cylinders and outlets adjacent to the other ends of the cylinders and into the fan housing, and a suction fan on the shaft and in said housing.

2. An engine including opposed cylinders each having an exhaust port, a compression chamber opening into each cylinder and having a valved intake, opposed reciprocating main pistons in the main cylinders each having a tubular extension providing a breather cylinder having intake ports positioned for intermittent communication with one of the chambers, each main piston constituting a closure for the exhaust port in its main cylinder and being proportioned to successively open the exhaust port and momentarily establish communication between said main cylinder and its compression chamber while said main piston approaches the end of its power stroke, a breather piston mounted for reciprocation in each breather cylinder, a shaft between the cylinders, driving connections between the shaft and the main and breather pistons respectively, said connections being timed to move the breather pistons in unison oppositely to the main pistons, a fan housing, casing housing the main cylinders having air inlets at the firing ends of said cylinders and outlets adjacent to the other ends of the cylinders and into the fan housing, an annular series of spaced longitudinal ribs on each cylinder providing air passages therebetween leading from the inlets and toward the outlets, and a suction fan on the shaft in the fan housing.

3. An engine including opposed cylinders each having an exhaust port, a compression chamber opening into each cylinder and having a valved intake, opposed reciprocating main pistons in the main cylinders each having a tubular extension providing a breather cylinder having intake ports positioned for intermittent communication with one of the chambers, each main piston constituting a closure for the exhaust port in its main cylinder and being proportioned to successively open the exhaust port and momentarily establish communication between said main cylinder and its compression chamber while said main piston approaches the end of its power stroke, a breather piston mounted for reciprocation in each breather cylinder, a motor-generator shaft between the cylinders, driving connections between the shafts and the main and breather pistons respectively, said connections being timed to move the breather pistons in unison oppositely to the main pistons, a fan housing, casings housing the main cylinders having air inlets at the firing ends of said cylinders and outlets adjacent to the other ends of the cylinders and into the fan housing, and a combined suction fan and fly-wheel on the shaft and in the housing.

4. An engine including opposed cylinders each having an exhaust port, a compression chamber opening into each cylinder and having a valved intake, opposed reciprocating main pistons in the main cylinders each having a tubular extension providing a breather cylinder having intake ports positioned for intermittent communication with one of the chambers, a diametrical pin in and carried by each breather cylinder, each main piston constituting a closure for the exhaust port in its main cylinder and being proportioned to successively open the exhaust port and momentarily establish communication between said main cylinder and its compression chamber while said main piston approaches the end of its power stroke, a breather piston mounted for reciprocation in each breather cylinder, cooperating means on the main and breather cylinders for holding them against relative rotation, a driving element between the main cylinders, driving connections between said element and the pins in the breather cylinders, driving connections between said element and the opposed breather pistons and slidable within and guided by the pins, all of said connections cooperating to move each breather piston oppositely to its breather cylinder, said main pistons being connected for reciprocation in unison and said breather pistons being movable in unison oppositely to their main pistons.

5. An engine including opposed cylinders each having an exhaust port, a compression chamber opening into each cylinder and having a valved intake, opposed reciprocating main pistons in the main cylinders each having a tubular extension providing a breather cylinder having intake ports positioned for intermittent communication with one of the chambers, ad iametrical pin in and carried by each breather cylinder, each main piston constituting a closure for the exhaust port in its main cylinder and being proportioned to successively open the exhaust port and momentarily establish communication between said main cylinder and its compression chamber while said main piston approaches the end of its power stroke, a breather piston mounted for reciprocation in each breather cylinder, each main cylinder having guide grooves, bosses on the breather cylinders slidable in the grooves for holding the main and breather cylinders against relative rotation, said pins being extended into the bosses, a driving element between the main cylinders, driving connections between said element and the pins in the breather cylinders, driving connections between said element and the opposed breather pistons, said latter connections being slidable within and guided by the pins, all of said connections cooperating to move each breather piston oppositely to its breather cylinder, said main pistons being connected for reciprocation in unison and said breather pistons being movable in unison oppositely to their main pistons.

CLEBURNE HIGGINS MERRELL.